UNITED STATES PATENT OFFICE.

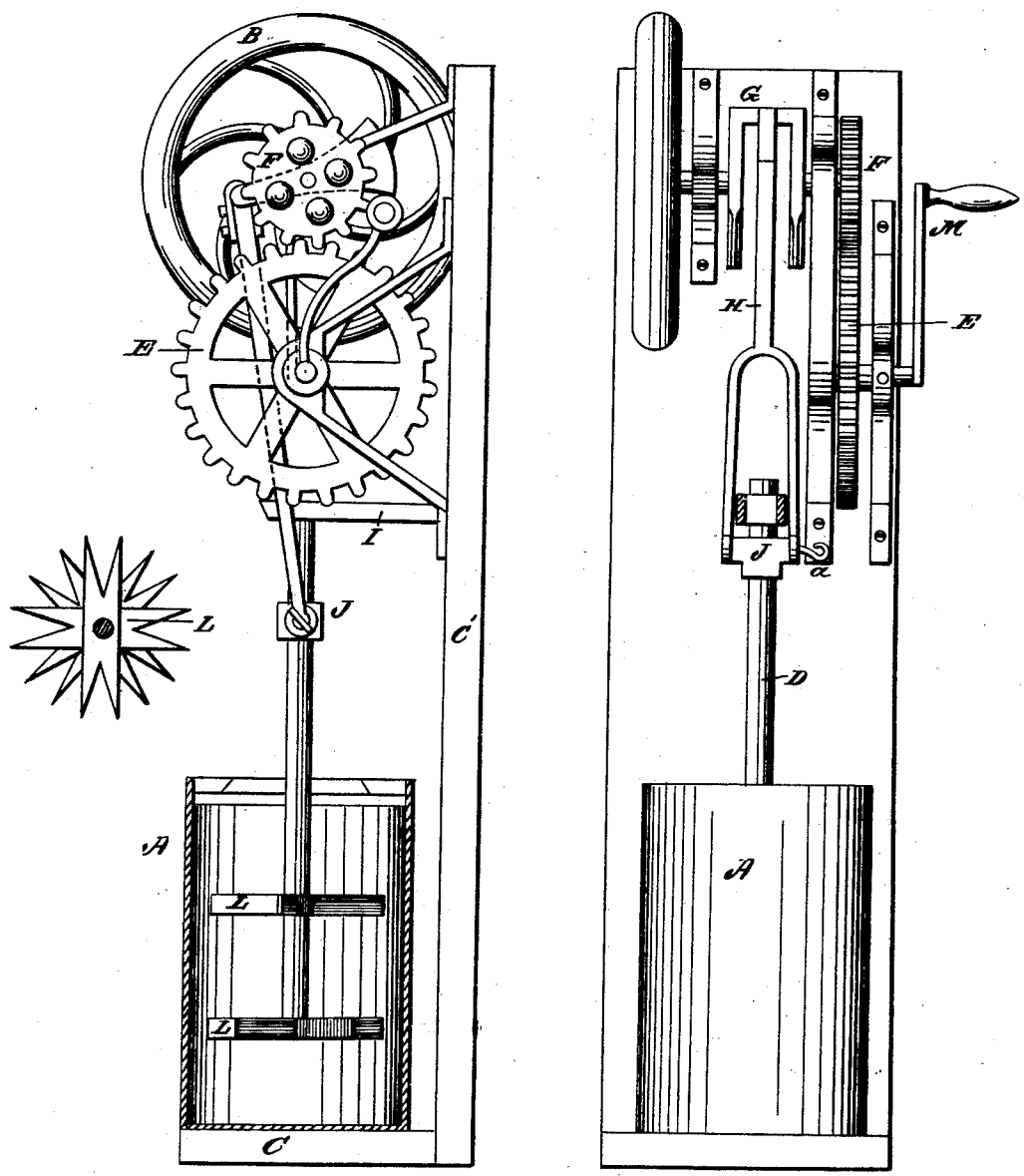

LORENZO LAKE, OF MIDDLEBURY, PENNSYLVANIA, ASSIGNOR TO HIMSELF, AND WILLIAM PATTON, OF TOWANDA, PENNSYLVANIA.

CHURN.

Specification of Letters Patent No. 24,845, dated July 19, 1859.

*To all whom it may concern:*

Be it known that I, LORENZO LAKE, of the town of Middlebury, in the county of Tioga and State of Pennsylvania, have invented certain new and useful Improvements in Churns; and I do hereby declare that the following is a full, clear, and exact description of the same, reference being had to the accompanying drawings and to the letters of reference marked thereon.

The nature of my invention consists in constructing and arranging the several parts together which will be hereinafter particularly described.

In the drawings Figure 1 represents a side elevation. Fig. 2 represents a front view.

In the figures C, represents a platform on which the churn A, stands.

C′ represents an upright secured to the platform C, to which those parts are attached which operate the churn dasher and staff.

G, represents a crank shaft which has its bearings in suitable supports which are attached to the upright C′.—This shaft G, is provided with a balance wheel at one end, and with a gear wheel, F, at the other and the crank in the center of said shaft has a pitman H, attached to it. The wheel F, gears into a wheel E, which is properly supported and secured to upright C′.

M, is a handle secured to the shaft of gear wheel, E.

D, represents the churn staff which passes through a guide I, and through a thimble J.

A rod *a*, passes through the prongs of the lower end of the pitman, through the thimble and through the churn staff—thus securing the churn staff to the pitman.

L, L, represent the dashers, which are formed as shown in the small figure marked L.—The dashers consist of two or more pieces of boards, which are secured together, of a proper and convenient length having V. shaped slots cut in their ends, and these dashers are so placed upon the staff that the sharpened ends of the boards thus cut, will cover the spaces left between the boards in the dasher immediately above or below— so that when operated in the churn the cream will be more thoroughly cut and the globules will be more easily and speedily broken.

In operating this invention power is applied to the handle M, and by means of this motion is communicated to the wheels E, and F, to crank G, wheel B, to the pitman H, and then to the churn staff D. The wheel F, being about one half the size of wheel E, it has double the motion of the handle, and the pitman and staff have a correspondingly fast motion. The chief advantages arising from this arrangement is first the dashers being constructed in the peculiar manner set forth the globules are more easily broken and the butter is churned quicker than by the old plan. The thimble J, and pin *a*, secure the staff to the pitman at any desired point, and may be changed in a moment of time, the guide I, guides the upper end of the churn staff and keeps it in a proper perpendicular position and the pitman, fly wheel, and gear wheels serve to give an easy and rapid motion to the staff whereby a child or small boy may do great execution in churning even with a very large churn.

The form of double dasher which I use is easier and more effectively operated than the ordinary form of dasher; because, instead of lifting the whole body of the cream near the circumference, where it is the hardest to lift, as in the case of circular dashers and their approximate forms in general use, it is cut by the points of the dasher. In the descending motion of the dasher, those portions of the cream escaping through the large spaces in the lower dasher are met and cut by the points of the upper one; and, in the same way, in the ascending motion, the portions of cream escaping through the large spaces in the upper dasher are met and cut by the lower one, the points of the upper and lower dashers being so arranged as to be placed directly opposite those large spaces. This dasher moreover exercises an auxiliary power of agitating the cream by forcing it out from the center and dashing it laterally against the side of the churn thereby giving it a lateral dashing as well as a perpendicular cutting motion.

I do not wish to lay any claim to the individual parts of this arrangement nor to the simple application of gear wheels, &c., to a churn, my invention being more particularly confined to the peculiar arrangement of the several parts, when the dasher and other parts are constructed in the manner set forth above.

I claim—

The dasher made in the manner as described in my specification, and shown in drawing at L, when the same shall be operated by the devices as described, for the purpose herein set forth.

LORENZO LAKE.

Witnesses:
N. N. RETTS,
T. G. PATTON.